Feb. 22, 1955 M. V. KALFAIAN 2,702,830

MULTIPLEX COLOR-VIDEO AND AUDIO-MODULATED COLOR TELEVISION

Filed March 9, 1954 9 Sheets-Sheet 1

INVENTOR

INVENTOR
Alzun V. Kalfaian

INVENTOR
Myron V. Kalfaian

SINE-SQUARED FUNCTION GENERATOR

INVENTOR
Mgar V. Kalfaian

Feb. 22, 1955 M. V. KALFAIAN 2,702,830

MULTIPLEX COLOR-VIDEO AND AUDIO-MODULATED COLOR TELEVISION

Filed March 9, 1954 9 Sheets-Sheet 5

FINAL AM MODULATOR (ENVELOPE-SHAPER)

INVENTOR

Myron V. Kalfaian

Feb. 22, 1955 — M. V. KALFAIAN — 2,702,830

MULTIPLEX COLOR-VIDEO AND AUDIO-MODULATED COLOR TELEVISION

Filed March 9, 1954 — 9 Sheets-Sheet 6

INVENTOR
Myron V. Kalfaian

INVENTOR
Megan V. Kalfaian

INVENTOR
Magar V. Kalfaian

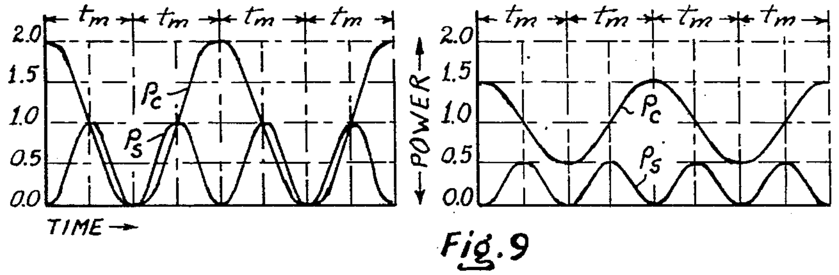
Fig. 9
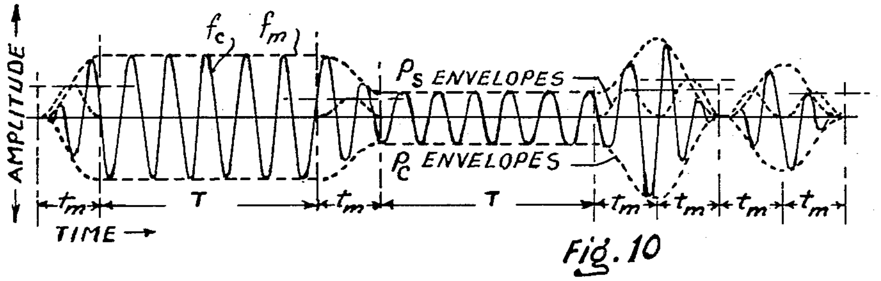
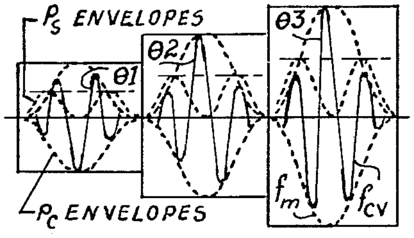
Fig. 11
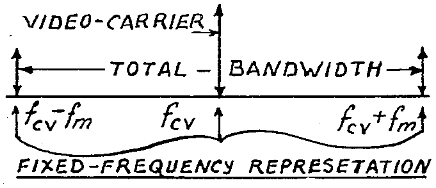
Fig. 12
INVENTOR
Mihran V. Kalfaian 2,702,830

MULTIPLEX COLOR-VIDEO AND AUDIO-MODULATED COLOR TELEVISION

Meguer V. Kalfaian, Los Angeles, Calif.

Application March 9, 1954, Serial No. 415,064

4 Claims. (Cl. 179—15)

This invention relates to color television, and more particularly to provide improved methods and means for the transmission and reception of color television signals. One object of the invention is to transmit video and audio signals over the same carrier wave without encountering video-audio cross-talk, whereby first, to eliminate the extra transmission power devoted to carrying the sound waves, and second, to eliminate critical adjustments that are usually required in tuning to two different carrier frequencies. Another object of the invention is to transmit video signals representing three primary colors over simultaneous amplitude and phase modulations of the carrier wave, whereby first, to provide accurate color selection at the receiving end without the necessity of color synchronization signals, and second, to provide high fidelity conveyance of the video signals by utilizing double-sideband transmission of the carrier wave. Still another object of the invention is to provide improved methods and means of scanning color-pictures, which according to the physiological behavior of the human eye in which it is capable of interpreting repetitious production of colored pictures, provides effectively the same amount of chromatic information on the viewing screen as it would ordinarily for monochrome pictures by the same amount of video components that are available in a given channel band. A further object is to provide methods and means for conveying picture-synchronizing signals over phase modulation of the carrier, whereby to provide greater accuracy in picture synchronization than is possible by the conventional serrated waveform.

In its broad aspects, and in view of the U. S. standard 6 megacycle channel band, the carrier is time divided into 3 million sinusoidal envelopes, and the carrier in each envelope is assigned to carry two simultaneous image signals by way of simultaneous amplitude and phase modulations. The amplitude variation of the carrier is assigned to convey continuous image signals of the green primary color; the phase angle variation of the carrier (in forward direction) in every second envelope is assigned to convey periodic image signals of the blue primary color; and the phase angle variation of the carrier (in backward direction) in every other envelope is assigned to convey periodic image signals of the red primary color. Thus, the image signals of the green primary color are conveyed continuously at 3 million per second, and the image signals of the blue and red primary colors are conveyed sequentially at 3 million per second; totalling 6 million image signals in the 6 megacycle channel bandwith. With this type of image scansion, it is observed that the time period allowed for each color image during a frame period is the same as allowed in monochrome image scansion. The color formation, however, is due to the fact that each succeeding image element is formed in a different primary color than the primary color of its preceding image element, and according to the physiological behavior of the human eye, each frame of the picture appears to be in full color. The frequency ratio between line-scansion and time-division of the carrier is so arranged that, each image element is further formed in its different primary colors during succeeding frame periods; thus constructing full color pictures with the same number of image elements that would normally be allowed for constructing monochrome pictures. The formation of each image element in three primary colors during three frame periods (without increasing the number of frames per second) will not cause image or color flicker, since as stated, each image element during a frame period appears in full color by the aid of its adjacent image elements in different primary colors, and the following frames will further augment for steady full color pictue formation.

Fig. 1*a* shows the normal arrangement of elemental color-sequence as reproduced on the viewing screen. The first frame shows elemental images reproduced individually in different primary color components; in the second frame the same image elements are reproduced individually in still different primary colors; and in the third frame elemental images are finally constructed in their three-color hues. It will be observed, however, that at the end of the first three frames every second succeeding image element will still contain two primary colors; this sequence being altered during the second three frames, such as shown in the last two rectangles of the drawing. The color sequence as shown in the drawing is obtained by arranging the number of image elements in horizontal and vertical directions equal to $4N+1$.

Another feature of the present invention is a color-sequence switch, which is particularly useful in conveying color pictures when one of the primary colors (blue or red) is absent. That is, when one of the primary colors is absent during normal sequence of the blue and red primary-color conveyance, the other primary color is conveyed instead, so as to avoid loss of signal conveyance time, as shown in Fig. 1.

For simultaneous sound transmission, the time-dividing sine wave (at three megacycles) is first frequency modulated by the sound, so that at the receiving end this frequency modulation can be detected by conventional discriminator circuits. In this case, the time dividing frequency is made less than 3 megacycles, so that the extra sidebands caused by sound modulation will be within the 6 megacycle channel bandwidth. While this sound modulation will reduce the number of video signals conveyed per second, a greater increase will be effected as the conventionally practiced equalization pulses (for picture synchronization) are eliminated in the presently proposed color system.

The foregoing brief description indicates that the present invention is not compatible with any of the presently standardized systems, but for services such as, military; medical; and theatre, do not require compatibility, and accordingly, the present invention is particularly contemplated for such services. The desirability of the present system with respect to compatibile, or other previously proposed systems, however, will be obvious from the advantages as given in the following: (1) The critical frequency separations between video carrier and sound carrier (both in monochrome and color systems) at the transmitter are completely eliminated, as a single carrier is used for video and sound transmissions; (2) No critical filtering or vestigial-sidebands, or special tapering of frequency bands between monochrome and chromatic signals are dealt with; (3) Picture-synchronizing signals are conveyed over phase modulation, which provides distinctly distnguishable sharp signals, and the normally practiced equalization pulses are eliminated; (4) In the NTSC compatible color system, fine details corresponding to video frequencies above 1.3 mc. are reproduced in monochrome; larger areas corresponding to frequencies between 0.5 mc. and 1.3 mc. are reproduced in a two-color orange-cyan system; and still larger areas, corresponding to frequencies below 0.5 mc. are reproduced in three-color red-green-blue (full color) system. Whereas in the presently proposed system, all the picture information is in full colors; (5) Color synchronization is inherently automatic; and (6) Detection of the phase modulation at the receiving end does not require a reference carrier wave for comparison purposes.

In observing sideband restrictions, special waveshaping of the carrier wave is required. For example, in time-division transmission where the carrier is interrupted abruptly at a sub-carrier frequency of the intelligence waves, the sidebands usually expand beyond undesired frequency regions. However, the output products of the modulated carrier can be restricted to the first order sidebands by controlling the waveshape of the time-divided carrier envelopes. Where these spectral limitations are observed, it is basic that the waveshape of the interruption be that of the curve of the sine squared function, which rises and falls from substantially zero level of the carrier. This type of waveshape controlled time division of the carrier may be achieved by sampling method, the function of which is particularly an object of this invention. Fig. 11 shows one form of the waveshape controlled carrier wave, wherein, the peak of each envelope represents one video signal, and the carrier phase (in steady state from boundary to boundary) with respect to the carrier phase in the preceding envelope represents another video signal. In this case, the peak amplitude of the carrier envelope represents the green primary-color signal of an image element; the carrier phase (in forward direction) in every second envelope with respect to the carrier phase in preceding envelope represents the blue primary-color signal of an image element; and the carrier phase (in backward direction) in every other second envelope with respect to the carrier phase in preceding envelope represents the red primary-color signal of an image element. Thus, the carrier phase in each preceding envelope represents a reference carrier phase to the carrier phase in succeeding envelope, for detection.

The total bandwidth occupied by the type of waveshape-controlled carrier wave, as described above, is shown in Fig. 12. The illustration of Fig. 10 shows how the carrier amplitude may be varied at a sub-carrier frequency without expanding the sidebands beyond the first pair of complementary sidebands. And Fig. 9 illustrates graphically the phase relations between the instantaneous power output of the carrier and its side components, with the type of waveshape controlled carrier modulations. The theory of sideband behavior involving this type of carrier modulation may be referred to my patent application, Serial No. 290,723, May 29, 1952, now Patent No. 2,683,770, July 13, 1954. The receiving apparatus may also be referred to this patent, as it will not be repeated in this application.

Having thus described the general characteristics of the present invention, reference will now be made to methods and means by which modulation of the carrier wave may be controlled to meet the above stated requirements. In the drawings:

Figs. 1 and 1*a* illustrate scansion sequence of elemental images in different primary colors, in accordance with the present invention.

Figs. 9, 10, 11 and 12 are graphs, descriptive of the sideband theory included with the present invention.

*Steps in which the carrier envelopes are produced*

In order to modulate the carrier in the illustrated form of Fig. 11, the carrier wave is produced in two separate channels, and the outputs of these two channels are gated in alternate sequence at the time-dividing frequency, so that during the quiescence of each channel the carrier envelope is waveshaped and simultaneously amplitude and phase modulated, by sampling method, and finally the periodic outputs of the two channels are combined for final transmission. For example, at the output of the first channel, the periodic carrier envelopes at M are produced, and at the output of the second channel, the periodic carrier envelopes at N are produced. Then by combining the periodic carrier envelopes at M and N, the desired waveform as shown at L is obtained. The peak amplitudes of the periodic envelopes of the carrier wave at M are determined by the steady state sampled voltages shown at O, and the peak amplitudes of the periodic envelopes of the carrier wave at N are determined by the steady state sampled voltages shown at P. The manner in which the carrier phase in each envelope is shifted in a steady state step will be described by way of the diagrammatic arrangement in Fig. 2.

*Phase modulator and color-sequence switch*

Figure 1:
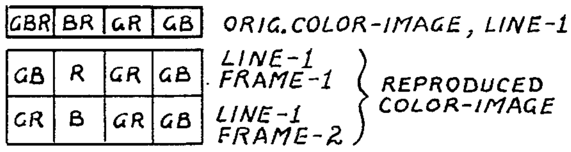
Figure 1A:
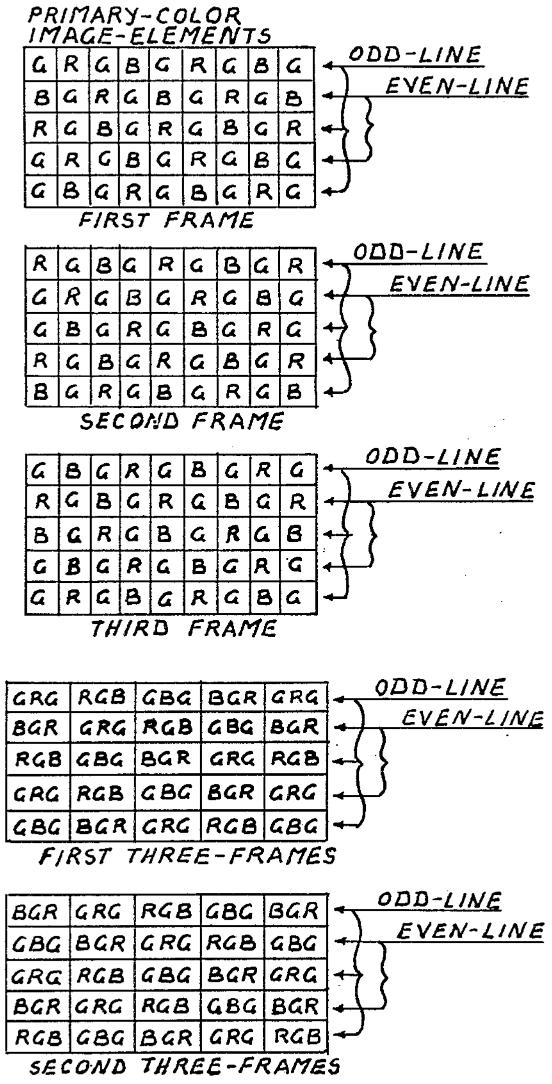
Figure 2:
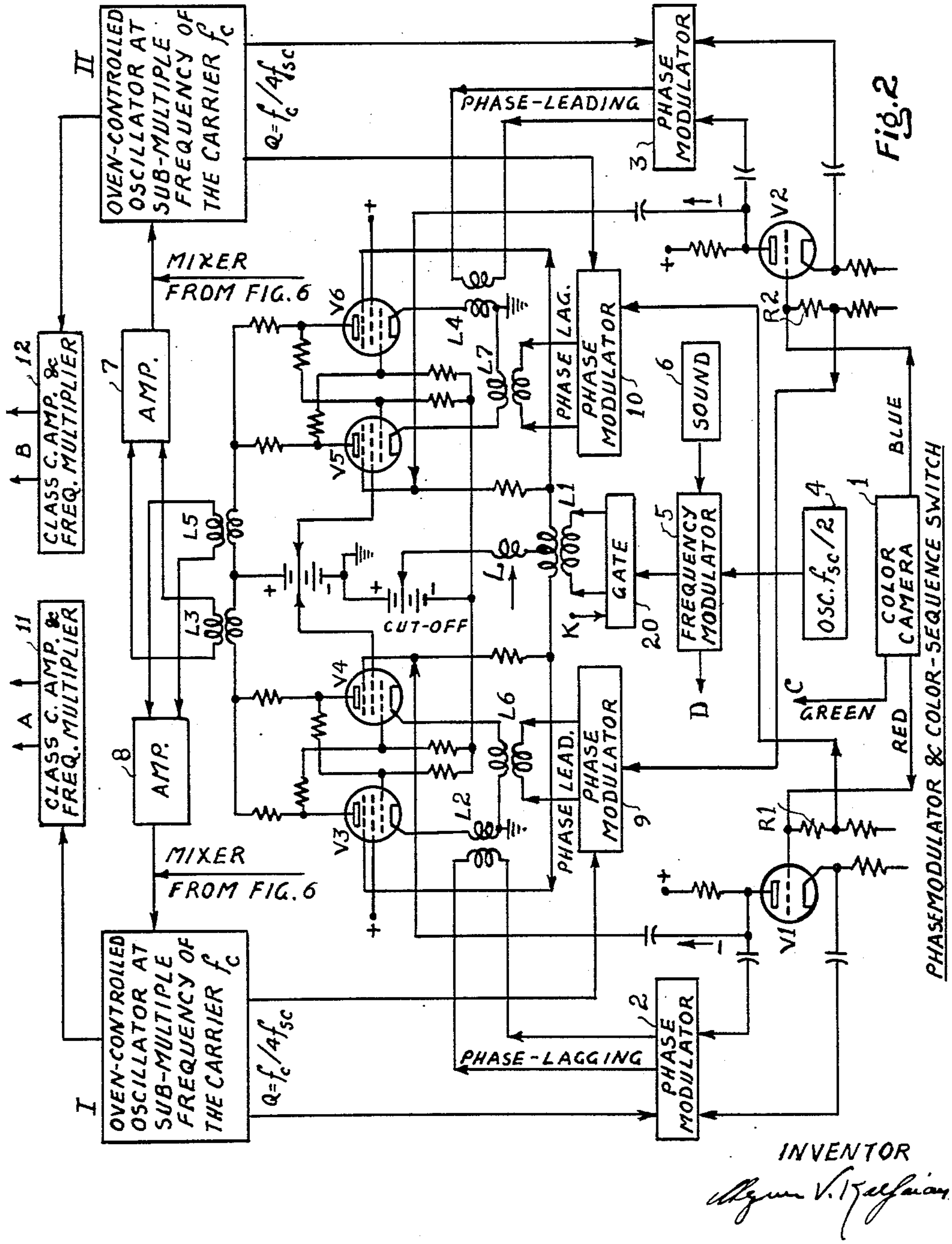
Fig. 2 is partly schematic and partly block diagram of the phase modulator and color-sequence reversing switch.

As explained in my above noted patent issue, the carrier wave is produced by two identical oscillators, which are intercoupled alternately at a sub-carrier frequency, to modulate the phase angles of each other's oscillations representative of the color signals. This is shown in Fig. 2, wherein, the blocks I and II represent the two oscillators, which are temperature controlled for frequency stability, and their Q is adjusted approximately equal to $f_c/4f_{sc}$, where $f_c$ is the carrrier, and $f_{sc}$ is the sub-carrier frequency.

In operation, the camera 1 (of a practical type) produces three output signals simultaneously, representing three primary colors, namely, red, green, and blue. The output red and blue video signals of the camera are separately applied upon the control grids of cathode-follower and phase-inverter tubes V1, V2, and the output signals of these tubes are in turn applied upon the phase modulator blocks 2 and 3 (of the conventional type), for modulating the phase angles of the oscillatory waves of I and II. To effect alternate intercoupling between the oscillators I and II, the output phase modulated oscillations of modulator blocks 2 and 3 are cross coupled to the inputs of the oscillators I and II through two separate switching gates; the first of which comprises trigger tubes V3, V4, and the second comprises trigger tubes V5, V6.

These trigger gates are highly negative-biased, so that both halves of each trigger are normally anode current cut-off. Their operations are effected by the alternate positive half-cycles of the sine wave from across inductance L1, at a frequency $f_{sc}/2$. This wave is originated in oscillator block 4, the output sine wave of which is first frequency-modulated in block 5, which may be of the conventional reactance tube, by the sound wave originating in block 6, so that sampling periods of the three primary-color video signals will vary in exact synchronism with the periodicity of the final frequency-modulated (by sound) sub-carrier wave throughout the system; in this case, the sub-carrier $f_{sc}$ being obtained by doubling the frequency of the wave arriving from block 5. Assuming at one given instant that the positive half-cycle voltage from across coil L1 raises the normal negative bias upon the suppressor grids of tubes V3 and 4V simultaneously, these tubes assume anode conductance. But in doing so, each one impresses an amplified negative potential upon the other's first control grid, and any unbalance between the two causes one to become anode conductive and the other non-conductive by sudden regenerative action. Final conductance of any half service of this trigger may be predetermined, for example, as shown in this case, by applying the video-red signal from cathode-follower tube V1 in negative potential upon the suppressor grid of trigger tube V4, so that during the positive half-cycle period of the wave from across coil L1 upon the suppressor grids of V3 and V4, the tube V3 will become the decided conductive one, and the phase modulated oscillation from across coil L2 will be admitted therethrough upon the output coil L3, and finally applied upon the input of oscillator II, through amplifier block 7 if necessary, to forcefully adjust the phase of its normal oscillation. During the following negative half-cycle period of the wave from across L1, the state of trigger tubes V3 and V4 will have resolved to complete quiescence, and the oscillator II will keep on oscillating thereon in steady state, from its last resolved phase angle. During this period however, the suppressor grids of trigger tubes V5 and V6 receive positive voltage from coil L1, and the phase modulated oscillation from across coil L4 is admitted through trigger tube V6 (which experiences similar switching action as of the former) upon the output coil L5, and finally upon the input of oscillator I, through amplifier block 8 if necessary, to forcefully adjust the phase of its normal oscillation. It is thus seen that, the oscillators I and II are alternately forced to change their phases in steady state conditions, by angles representative of the red and blue video signals, measurable from phase angles that the oscillations I and II resolve in immediate preceding intervals.

In order to effect color-sequence reversal during any elemental time interval when the assigned color-signal is absent on the scanned picture for transmission, each half section of the two triggers, opposite those sections that are assigned to admit normal signal-sequence, is normally excited by the replacement signal. For example, the cathode circuit of trigger tube V4 is normally excited by the blue-signal phase-modulated oscillatory voltage from across coil L6, and the cathode circuit of trigger tube V5 is normally excited by the red-signal phase-modulated oscillatory voltage from across L7. As explained in the foregoing, the suppressor grids of tubes V4 and V5 receive negative video-potentials from the cathode-follower tubes V1 and V2, so that the tubes V4 and V5 would be inoperative during normal color-sequence operation. However, the screen voltages of these latter tubes are so adjusted that, in the absence of negative potential from the cathode follower tube V1 or V2, that particular trigger-tube will assume higher conductance than its mate tube, and accordingly, the replacement signal (oscillatory voltage) will pass on to the associate oscillator, instead of the former.

For practical operation, the output oscillations of phase modulators 2 and 3, and also of modulators 9 and 10, are fed to the cathode circuits of the trigger tubes, so as to minimize negligibly the capacitive coupling to the oscillators I and II during non-operative periods. Of course, neutralizing capacitors may also be used, or, different trigger tubes may be chosen for the particular purpose. The arrangement shown, however, will provide the required performance without frequent attention; this operation also being advantageously possible because of the low power level existing in this section of the transmitter. The oscillators I and II are normally intended to be tuned to the carrier frequency, but in high frequency practice it is usually simpler to generate the carrier wave at a sub-multiple frequency at low power level, and multiply it to the required carrier frequency as the power is amplified. Accordingly, these identical oscillators are tuned to some sub-multiple of the carrier, and multiplied to the desired carrier frequency in the radio-frequency power amplifiers 11 and 12. The frequency of the oscillations of I and II may even be lower than the sub-carrier frequency, in which case, they are first multiplied to a higher frequency than the sub-carrier frequency, feeding to the phase modulators 2, 9 and 3, 10, and the outputs of amplifiers 7 and 8 being frequency-sub-divided in feeding to the oscillators I and II. Since the phase modulated carrier in this section is of constant amplitude, the amplifiers 11 and 12 may be of class B or class C operation, for high efficiency. The gains of these amplifiers, however, should be identical, but this is relatively simple to achieve by a comparison servo system, such for example, as described in my copending application Serial No. 386,983, filed Oct. 19, 1953.

*Saturation control*

As stated previously, the inclusion of color-sequence reversal requires saturation (amplitude) control of the color image signals. For example, in normal operation the green signal is assigned for continuous transmission, and the blue and red signals are assigned for transmission in alternate sequence. In the case that the illuminations of the three primary colors on the viewing screen were adjusted to equal magnitudes, the green primary-color would appear brighter than the other primary-colors, due to the differences in illumination periods from frame to frame. This condition may be easily controlled at the receiving end by a fixed brightness adjustment. When color-sequence reversal of the red and blue image signals is included, however (due to the absence of one color-image signal), the length of illumination period of the replacement color-image signal increases on the viewing screen, and an elemental brightness control becomes essential. Since however, the trigger tubes V4 and V5 admit only the replacement signals, these saturation controls may be easily achieved by fixed attenuation controls at the inputs of phase modulators 9 and 10, for example, by fixed tap-adjustments at R1 and R2. The tap adjustments on R1 and R2 are shown for convenience, as the phase modulators 9 and 10 may be controlled by the outputs of cathode followers V1 and V2, with the proper attenuation adjustments, the fixed values of which may be predetermined visually on the viewing screen.

*Time sequence of sampling*

According to the type of elemental scansion of the primary colors, as described in the foregoing, it will be noted that the phase shifting process of either oscillation I or II (in Fig. 2) should be performed during the first quarter period of the frequency-modulated wave at $f_{sc}/2$. For this reason, the wave from block 5 is frequency-doubled (not shown for simplicity of drawing), and applied to the inductance L. The switching voltage applied upon the suppressor grids of the trigger tubes will then have the shape of pulses *d* and *e* in Fig. 3*a*, the condition of which will be more clearly described in connection with the diagram of Fig. 3.

Figure 8:
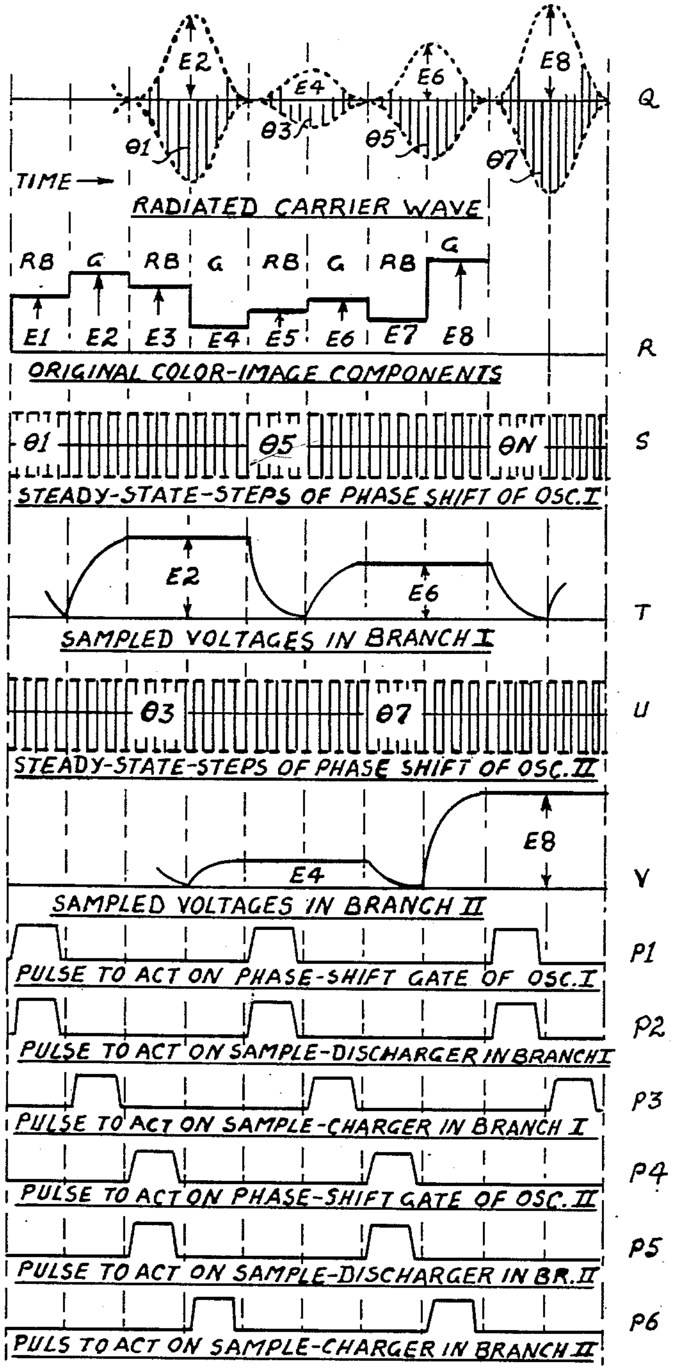
Fig. 8 is an illustration of various waveforms in describing various functions of the transmitter.

The illustration of Fig. 8 shows more clearly the phase relations of these samplings. For example, the phase angle $\theta 1$ of the carrier in the first envelope (at Q) represents an image element of the scanned picture, and the peak E2 of the carrier envelope represents a succeeding image element of the scanned picture. As stated previously, these signals must be sampled and stored prior to the production of that carrier envelope. The video signals are shown at R, wherein, E1, E3, etc., may be either red or blue primary-color image signals, and E2, E4, etc., may be just green primary-color image signals; the red and blue signals being devoted to phase modulation, and the green signals being devote to amplitude modulation. The time lengths for these samplings should then be as follows: During the video signal E1, the oscillation of oscillator I (in Fig. 2) is shifted as $\theta 1$ (at S), which keeps on oscillating at that phase in steady state. During the video signal E2, (at R), the amplitude sampler (to be described further) stores a proportional voltage and retains its level in steady state, as indicated by the straight line at amplitude of E2, at T. Thus, during the formation of the first carrier envelope, at Q, the modulation phase $\theta 1$ and the modulation amplitude E2 remain in steady states; the envelope shape is also formed during this period, the manner of which will be described further. During this carrier envelope, the phase of the oscillation II, at U, is shifted, and the following amplitude-sample is stored as E4, at V, in the similar mode as of the former. The pulses P1 to P6, inclusive, show the time phase relations of the above-said samplings.

*Green-video sampler and amplitude modulator*

For high efficiency radio-frequency amplification, it is customary that amplitude modulation is performed at the last stage of the power amplifier. Accordingly in this arrangement, sampling of the green-video signal is performed at high voltage levels. Even though this may not appear to be an orthodox mode, the arrangement shown in Fig. 3 will provide the required performance without attention-requiring critical adjustments. In this case, the block diagram 13 represents high gain video amplifier of the green-signal, the nature of which is conventional, as practiced in the monochrome television art. The output of this amplifier is simultaneously applied to the control grids of cathode-follower and gate-tubes V7 and V8. The instantaneous peak video-voltage developed in the anode circuit of V7 is stored in the sampler capacitor C1 through half-wave rectifier V9, and the instantaneous peak video-voltage developed in the anode circuit of V8 is stored the sampler capacitor C2 through half-wave rectifier V10. The sampled video-voltages are stored in capacitors C1 and C2 alternately at the frequency-modulated wave $f_{sc}/2$, as arrived from the output D of block 5 in Fig. 2, and amplified by the block 14 in Fig. 3. Prior to each sampling, the storage in the capacitor must be discharged, which is achieved by the associated discharger tubes V11 and V12; normally biased to anode current cut-off by 15. As the Q of either C1 or C2 is high, e. g., the loading effects across either one of these capacitors must be substantially high, so as to avoid discharging effect, the stored potentials across these capacitors are direct-coupled to the control grids of cathode follower tubes V13 and V14, the outputs of which (from across cathode circuit resistances R3 and R4) are applied upon the control grids of power-modulators tubes V15 and V16, to amplitude modulate the phase-modulated carrier wave arriving at inductances L8 and L9 from the outputs of power amplifier 11 and 12 in Fig. 2. It will be noted in the schematic arrangement that the voltages developed across the cathode circuits of gates V7 and V8 are applied upon the cathode elements of the rectifiers V9 and V10, by the neutralizing capacitors *nc*, so as to nullify the capacitive coupling of these rectifier tubes during steady state operating periods.

Figures 3, 3A:
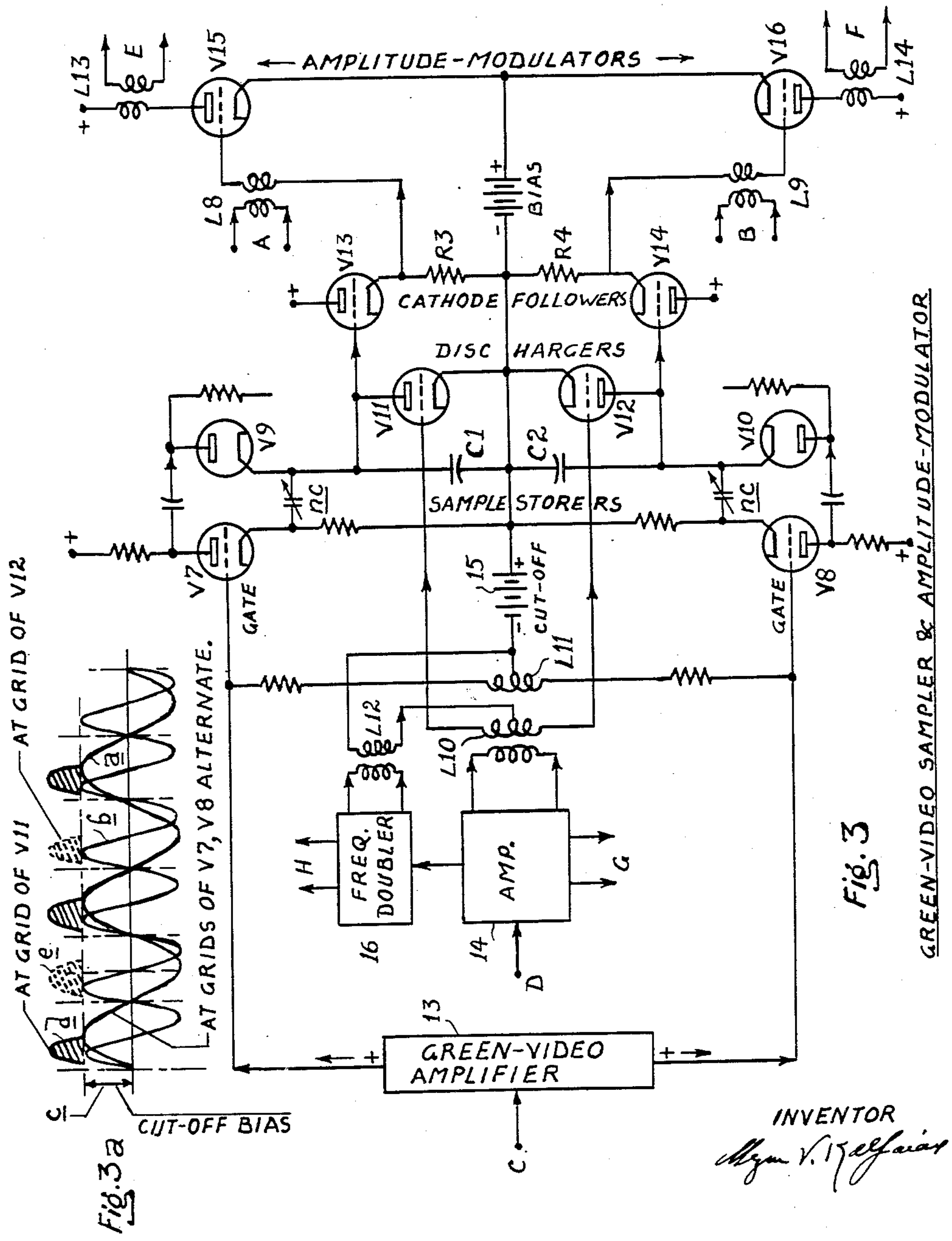
Fig. 3 is the amplitude-signal sampler and amplitude modulator.
Fig. 3*a* is the waveform involved in describing the former diagram.

The time intervals of the above operation, as well as part of the waveforms involved in each operation are graphically illustrated in Fig. 3*a*. To show the phase relation of one function with another, the frequency modulated $f_{sc}/2$ from amplifier 14 appears across coils L10 and L11, which is shown by the wave *a*. The frequency-doubled wave $f_{sc}$ from block 16 appears across coil L12, which is shown by the wave *b*. In combination with the negative bias 15, the magnitude of which is shown at *c*, these two waves produce periodic positive pulses, such as shown by the solid-lined shaded pulses *d* and the dotted-lined shaded pulses *e*. Prior to sampling and storing in capacitors C1 and C2, the discharger tubes V11 and V12 receive these positive pulses upon their control grids, so as to become conductive and discharge previous storage for re-sampling. For example, during the upper half-cycle of wave *a*, across coil L11, the gate tube V7 becomes conductive and transmits the video signal from block 13 to the capacitor C1 for storage, through the rectifier tube V9. Prior to final storage however, the control grid of discharger tube V11 receives the positive pulse *d* (by way of combined voltages from across L10 and L12), and discharges previous storage in C1. Similarly, during the lower half-cycle of wave *a*, the gate tube V8 becomes conductive and transmits the video signal from block 13 to the capacitor C2 for storage, through the rectifier tube V10. Likewise, prior to final storage, the control grid of discharger tube V12 receives the positive pulse *e*, and discharges previous storage in C2. Since during non-conductive periods of either tubes V7, V11, or V8, V10, and also of cathode-follower action of either V13 or V14, the loading impedances across capacitors C1 and C2 are extremely high, the sampled voltages across C1 and C2 remain in steady states during signal-modulation periods of the carrier at the grids of modulator tubes V15 and V16. Thus, the output coils L13 and L14 contain periodic steady state amplitudes and phase modulations of the carrier wave in alternate sequence, at the half-cycle periods of the frequency-modulated (by sound) wave $f_{sc}/2$, from amplifier block 14.

The amplitudes of these steady state portions of the carrier must now be shaped to the simple curve of the sine-squared function, and the non-steady portions cancelled out therefrom. The cancellation of these non-steady portions of the carrier is simple, and the wave-shaping may be accomplished by first producing periodic functions of the desired shape, and re-modulating the amplitude of the steady-state-modulated carrier by these functions. The sine-squared function generator shown in Fig. 4 will satisfy these requirements.

*Sine-squared function generator*

Figure 4A:
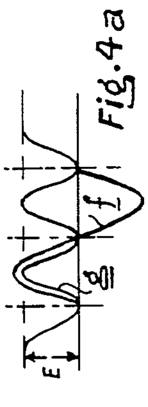
Fig. 4*a* illustrates waveforms involved in describing the former arrangement.
Figure 4:
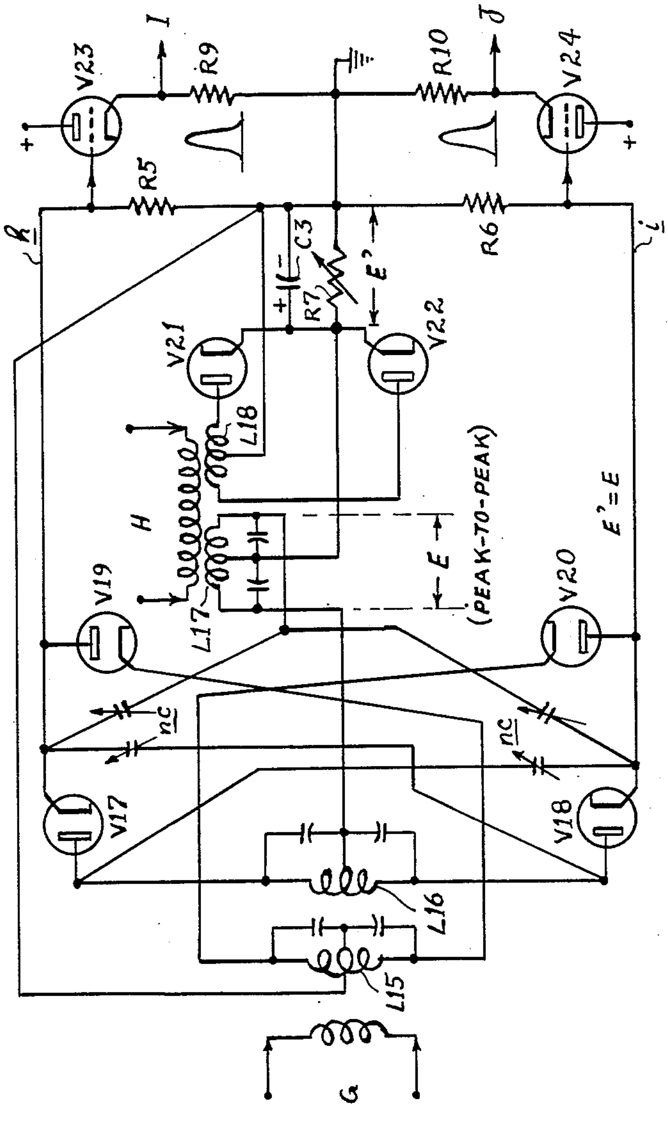
Fig. 4 is a schematic arrangement for producing the required sine-squared functions.

In order to avoid complicated pulsing and waveshaping arrangements for the production of these periodic functions, the frequency-modulated (by sound) sine wave (from the output of block 14 in Fig. 3) at G, in Fig. 4, is transformed across the center-tapped coils L15 and L16. The output voltage across coil L16 is utilized as an alternating switching voltage, and it is alternately applied upon the anode elements of half-wave rectifier tubes V17 and V18, which complete a closed circuit through resistances R5, R6, and the center tap of coil L16. Thus each time the voltage across coil L16 alternates, a half-sine-wave positive-voltage appears across R5 or R6 at the cathode elements of V17 and V18. The alternating voltage across coil L15 is applied (in equal amplitude as from L16) as an opposition voltage to the former, through the oppositely polarized rectifier tubes V19 and V20, so as to nullify the voltage across resistances R5 and R6. The purpose of this particular function will be obvious in connection with the following.

The frequency-doubled wave at H (from the output of frequency-doubler block 16 in Fig. 3) is inductively coupled to the secondary inductances L17 and L18. The voltage across coil L17 is simultaneously applied to the anode elements of rectifiers V17 and V18 through the center tap of coil L16, the rectified voltages of which appear across resistances R5 and R6. The voltage across coil L18 is utilized as a bias voltage, which is produced across the parallel-connected network, comprising resistance R7 and capacitor C3, through rectifier tubes V21 and V22 (this bias voltage may be supplied from outside source, but regulation with respect to the peak-to-peak voltage across coil L17 will be required, and such regulation will be automatic with the arrangement shown, by similar variations of the voltages across coils L17 and L18). The polarity of this bias voltage is such that it causes normal current flow through the rectifier tubes V17 and V18 (without considering the voltages from across coils L15 and L16), but its amplitude is so fixed that, the currents through V17 and V18 reach zero when the voltage across coil L17 is at its negative peak. In other words, the D. C. voltage E' is adjusted equal to the peak-to-peak voltage of the sine wave across L17, whereby normally (without considering other voltages), the waveform of the simultaneous voltages across resistances R5 and R6 have the simple curve of the sine-squared function. Now in order to cancel out these functions periodically from across these resistances, without distorting the waveshape, the sine wave from across coil L15 is applied alternately upon the cathode elements of rectifiers V17 and V18, in peak value equal to, or higher than the voltage E; having the phase relations, as shown in Fig. 4*a*, wherein, the wave *f* represents the voltage across coil L16, and the wave *g* represents the voltage across coil L17. Due to these amplitude and phase relations of the given voltages, the voltage production across resistances R5 and R6 is now periodic, and alternate. These periodic voltages, however, are no longer of the desired waveshape, as they contain half-cycle sine wave functions. To finally cancel out these undesired distortions, the sine wave from across coil L15 is now applied upon the resistances R5 and R6 through half-wave rectifiers V19 and V20, in opposite polarities with respect to the former, so that such cancellation is completed.

In order to show that the oppositely polarized voltages from across coils L15 and L16 cancel out each other's existence completely at the resistances R5 and R6, and yet provide the required periodic switching action of the voltages across these resistances, assume that during one alternation period the rectifier V17 starts conducting, and admits the positive voltage from across coil L17, in addition with the positive voltage from across coil L16. During this period, the anode element of rectifier V18 receives negative voltage from coil L16, so that the positive voltage from across coil L17 cannot drive this rectifier to conductive state, and accordingly, current is prevented from flowing through R6. Simultaneously, the negative voltage from across coil L15 is applied upon the cathode element of rectifier V19 for conduction, but since this voltage is equal to the voltage from across coil L16 driving the rectifier V17, these two voltages are nullified at the terminal point *h*, while the positive voltage from across coil L17 passes freely through rectifier V17, and appears at the terminal point *h*. During this period, the positive voltage from across coil L17 is prevented from passing through rectifier V18 by strong negative voltage received from the coil L16. The voltage across coil L15 is at this time positive upon the cathode element of rectifier V20, so that this voltage is also prevented from passing therethrough, to cause any signal to appear at the terminal point *i*; thus effecting complete switching action.

In ordinary diode devices, comprising cathode and anode elements, the zero volt does not agree with zero current, due to the normal velocity gained by the electrons at the point of cathode emission; thus producing non-linearity at the minimum level of rectification. This may be improved, however, by utilizing triodes or pentodes with their grid elements connected to the cathode. In this case, the normal cathode emission is collected by the grid elements, and the anode current becomes a linear function from minimum to maximum. To cancel out the inherent capacitive elements of these rectifier tubes, neutralizing capacitances *nc* are used, as shown in the drawing.

Figure 5:
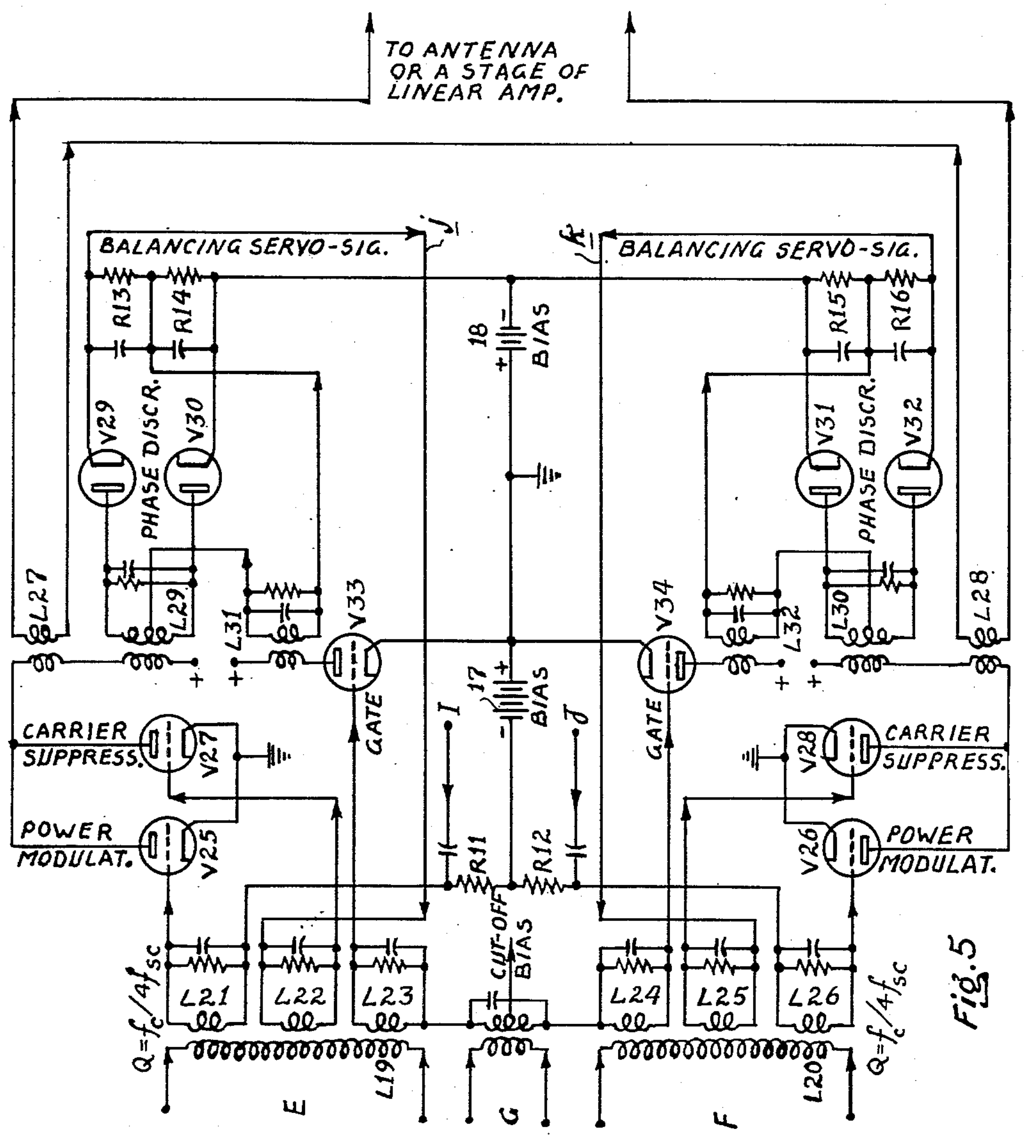
Fig. 5 is a schematic arrangement of the circuitry for final amplitude modulation and waveshaping of the carrier wave.

In order to provide low impedance paths for the grid-current harmonics of the final amplitude-modulator stage, the output voltage from across resistances R5 and R6 are applied to the control grids of cathode follower tubes V23 and V24, and the outputs are taken from their cathode circuit resistances R9 and R10. These resistances may be, for example, 100 ohms, or less, so that the non-linear loading effects of the final modulator grid circuit will not appreciably affect the waveshape of the final radiated carrier envelopes. The final modulator stage is shown in Fig. 5.

*Final amplitude-modulator stage*

The final stage of modulation (shown in Fig. 5) has three functions; first, to cancel out the unwanted portions of the composite modulated carrier wave arriving at coils L19 and L20 (from the tank circuits L13 and L14 of the amplitude modulators V15 and V16 in Fig. 3); second, to combine the steady-state modulated portions of the carrier wave at its output feeding to the antenna (or a power stage of linear amplifier, if so chosen in practice); and third, to waveshape the amplitudes of these combined portions into the simple curve of the sine-squared function. This may be explained as follows.

The composite phase and amplitude modulated carrier wave across primary inductances L19 and L20 (received from the outputs E and F in Fig 3) are inductively coupled to the secondary inductances L21, L22, L23, and L24, L25, L26 respectively. The carrier voltage across coil L21 is applied upon the control grid of the power modulator tube V25, in series with resistance R11, and a normal negative bias source 17; this bias being adjusted for linear G*m* control of V25. The amplitude-modulating voltage, having the shape of sine-squared function, across resistance R11, is received from the terminal I (in Fig. 4). Similarly, the carrier voltage across coil L26 is applied upon the control grid of the power modulator tube V26, in series with the bias 17 and resistance R12, the wave-shaping modulator-voltage across which is received from the terminal point J (in Fig. 4). Up to this stage, amplitude modulation is conventional by V25 and V26, the plate tank circuits of which, comprising inductances L27 and L28, feed to the antenna, or a stage of linear amplifier, to combine the modulated carriers from inputs E and F. Cancellation of the unwanted periodic portions of the carrier from inputs E and F is achieved in the following manner.

The carrier voltage across L22 is applied upon the control grid of a suitable (non critical) electron tube V27, in opposite polarity with respect to the voltage received by the grid of V25 and L21. The anode element of V27 is connected in parallel with the anode element of V25, and the gain of V27 is so adjusted by bias source 18 (or by other suitable means) that the carrier voltage across the plate tank circuit L27 is cancelled out when the modulator voltage across R11 is zero. This adjustment is only approximate, as the servo-system associated therewith will provide accurate adjustment at all times without interruption. The carrier thus suppressed completely at the tank circuit L27, only those steady-state modulated portions of the carrier appear in this circuit; by the periodic modulating voltages across R11. This condition also holds true in the tank circuit L28 of modulator tube V26, by similar operation, wherein, the carrier voltage across L25 is applied upon the control grid of suppressor tube V28, in opposite polarity with respect to the voltage received by the grid of V26, the anode elements of the two tubes being connected in parallel, as in the former case. The suppression of the carrier across L27 and L28 by tubes V27 and V28 must be complete at all times, and this type of operation, of course, requires critical adjustments and constant attention. A simple servo system however, will provide adequately the required adjustments, as in the following.

It will be noted that the carrier voltage across L27 or L28 may assume one of opposite phases when improperly suppressed, e. g., when the suppressor voltage is too high the resultant carrier will be of one phase, and when the suppressor voltage is too low the resultant carrier will be of the opposite phase. Obviously, such manifestation of one or the other condition may be arrested, for example, by a phase-discriminator arrangement. The lower sections of the output tank circuits (separately wound coils) of modulators V25 and V26 are inductively coupled to the center tapped inductances L29 and L30, respectively. The carrier voltage across L29 is alternately applied upon the rectifier tubes V29 and V30, which complete a return circuit through resistances R13, R14, and inductance L31. Similarly, the carrier voltage across L30 is applied upon the rectifier tubes V31 and V32, which complete a return circuit through resistances R15, R16, and inductance L32. The carrier voltage across L23 is applied upon the control grid of gate tube V33, which is rendered normally non-conductive by a high negative bias, the destination of which terminal is not shown for simplicity of drawing. Also, the carrier voltage across L24 is applied upon the control grid of gate tube V34, which is normally rendered non-conductive by the same negative bias. The gates V33 and V34 are driven to conductive states alternately by the voltage at switching frequency $f_{sc}/2$, arriving at G from amplifier block 14 in Fig. 3. This switching voltage is so phased that, the gate tubes V33 and V34 become conductive alternately during the unwanted portions (even lesser periods of these portions) of the composite-modulated carrier wave arriving at E and F; thus admitting the carrier from across coils L23 and L24, in respective order, to the output coils L31 and L32. Neutralizing capacitors from coils L23 and L24 may be included, so as to cancel out the capacitive coupling to the anode circuits of V33 and V34 during non-operating periods, but these parts are not shown for simplicity of drawing. Unlike in conventional phase discriminators, the carrier phase across L31 is fixed at in-phase relation with respect to the voltage across coil L29, and similarly, the carrier phase across coil L32 is fixed at in-phase relation with respect to the carrier phase across coil L30. Thus when the carrier voltage across L31 is combined with the carrier voltage across L29, the output across R13, R14 will assume a D. C. voltage of either positive or negative polarity; depending on whether the phase across coil L29 is in one phase or in opposite phase; since as stated previously, improper suppression of the carrier across L27 causes the resultant carrier in one of two phases. This condition also holds true for the output D. C. voltage across resistances R15 and R16. Any phase change of the voltage for example, from across L31 and L29, due to temperature change, will not affect the accuracy of the servo system, due to one or the other phase required for satisfactory operation, except of course, when the phase variation reaches 90 degrees; but such drastic variation is not usual in ordinary practice.

Now referring to the production of the required servo voltages, as required for controlling the gains of suppression tubes V27 and V28, assume that during the admittance period of gate V33 the suppression of the carrier across coil L29 had not been complete. The admitted carrier across coil L31 combines with the non-suppressed carrier voltage across L29, and the resultant D. C. voltage at the output terminal *j* shifts the gain of V27 to either higher or lower value (this direction being predetermined by polarized termination) until the suppression across coil L29 is complete. Of course, such gain control cannot be instantaneous, but gain variation of an electron tube is a process at low frequency, and accordingly, the servo voltage from terminal *j* shifts to gain of V27 at slow variation until the carrier appearance across coil L29 during the operating periods of gate tube V33 is completely nulified. This servo voltage producing process is also related to the suppression tube V28, which in this case, receives its control voltage from the terminal *k*, in alternate periods to the former.

It had been stated previously that the final carrier envelopes must have a minimum reference amplitude, so that the phase modulations (representing red and blue video signal) may be conveyed when the green primary-color image signal is absent for transmission. This may be easily achieved by adjusting the bias voltage 15 in Fig. 3, so that the peak voltage across coil L11 normally drives the gate tube V7 or V8 to a low predetermined conductive state. The video signal from block 13 will contain a constant voltage in the process of being stored in either capacitor C1 or C2. While this condition is convenient for improving the linearity of gate tubes V7 and V8, the carrier outputs across coils L13 and L14 will nevertheless have a minimum reference level of the carrier, since in grid modulation by V15 and V16, 100% modulation cannot be realized without amplitude distortion. When this minimum reference level is too high, however (for power conserving purposes), carrier suppression, such as utilized at the outputs of V25 and V26 in Fig. 5, including the servo system, may be utilized in conjunction with the modulator tubes V15 and V16 in Fig. 3. In this case, a minimum reference voltage is necessarily utilized, such for example, by adjusting the bias voltage 15.

*Picture synchronizing signals*

Figure 6:
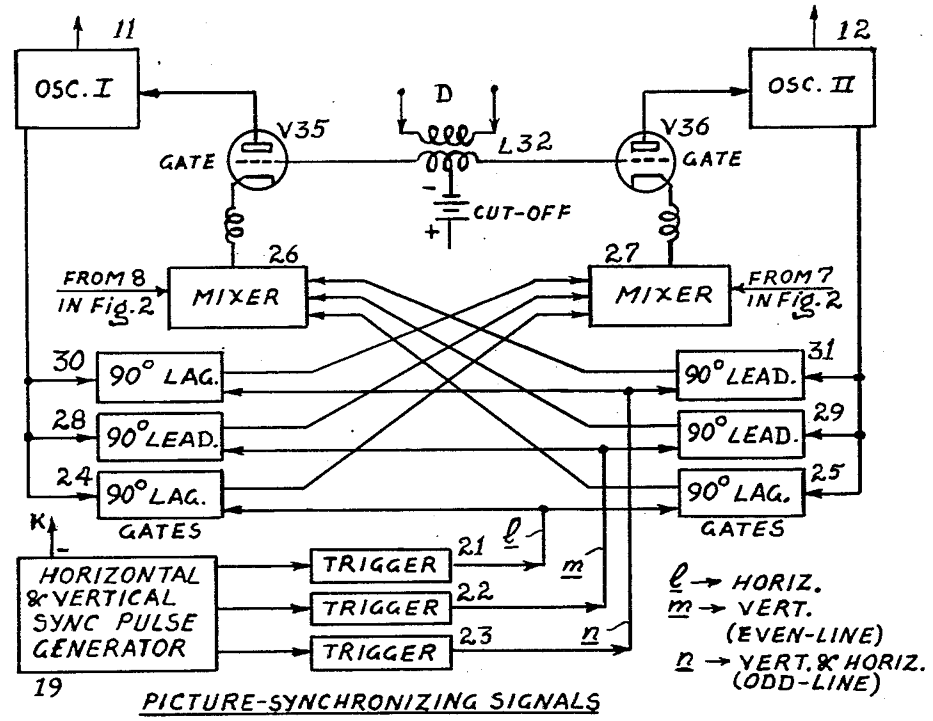
Fig. 6 illustrates mostly by way of block diagrams, how picture-synchronizing signals are conveyed.
Figure 7:
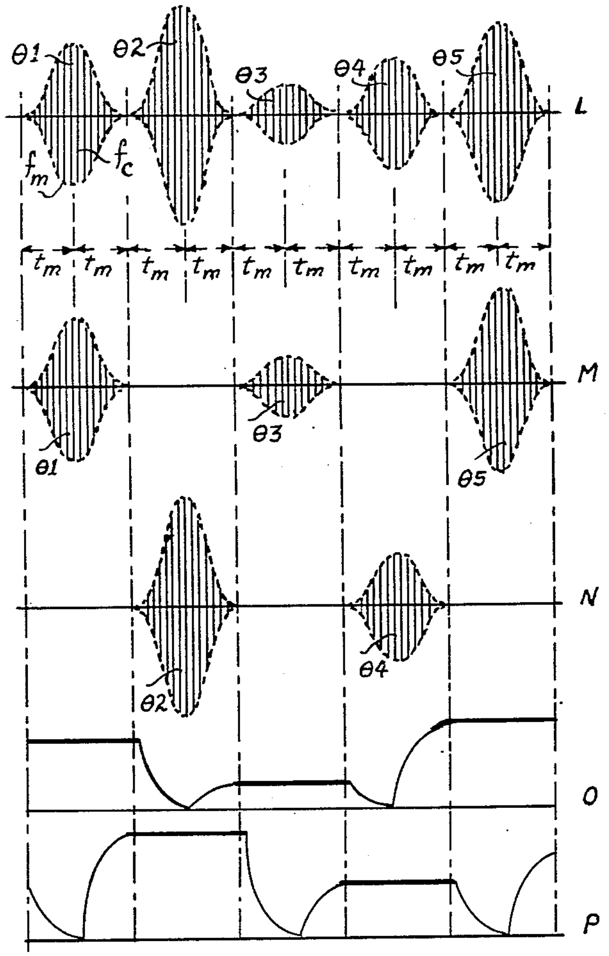
Fig. 7 illustrates the final waveform of the modulated carrier wave, and the steps in which it is finally produced.

Pulses having different time lengths and time sequence have been successfully produced and practiced in the art of television, and accordingly, the necessary pulses to be produced at given time periods are assumed to be arriving from the pulse generator block 19 in Fig. 6. For convenience, the pulses for horizontal; vertical for even line; and vertical for odd line, are assumed to be arriving separately from trigger circuits in blocks 21, 22 and 23, as designated by *l*, *m* and *n*, in the drawing. Also during any synchronizing pulse, the pulse generator 19 applies a large negative voltage upon the normally operating gate 20 in Fig. 2, so that the normal phase modulations by video signals are temporarily blanked out by closure of the gate to the switching voltage from block 5. At this time, the oscillators I and II act upon each other's inputs through the normally inoperative gate tubes V35 and V36, which are operated alternately by the voltage from across coil L32; this voltage being received from block 5 in Fig. 2. The operation is as follows.

Assuming first, horizontal synchronization, the trigger 21 produces a positive pulse and causes gates 24 and 25 to become operative. Immediately, the outputs of oscillators I and II pass on to each other's inputs (for phase adjustments) through these gates; mixers 26, 27, and the gates V35, V36, alternately by the alternate voltage from across L32 upon the control grids of V35 and V36. The gate blocks 24 and 25 include means for passing these oscillations at 90 degree lagging angles, and accordingly, the final phase modulation represents horizontal synchronization pulse.

Assuming second, vertical synchronization, for even line scanning, the trigger 22 produces a positive pulse and causes gates 28 and 29 to become operative. Immediately, the outputs of oscillators I and II pass on to each other's inputs (for phase adjustments) through these gates; mixers 26, 27, and the gate tubes V35, V36 in the preceding alternate mode. In this case, the gates 28 and 29 include means for passing these oscillations at 90 degree leading angles, and accordingly, the final phase modulation represents vertical (even line) synchronization pulse.

Assuming finally, vertical synchronization, for odd line scanning, the trigger 23 produces a positive pulse and causes gates 30 and 31 to become operative. Immediately, the outputs of oscillators I and II pass on upon each other's inputs (for adjustments) through these gates; mixers 26, 27 and the gate tubes V35, V36 in the preceding alternatnig mode. In this case, the gate 30 includes means for passing the oscillation of I at 90 degree lagging angles, and the gate 31 includes means for passing the oscillation of II at 90 degree leading angles, and accordingly, the final phase modulation represents vertical (odd line) synchronization pulse.

As indicated in the drawing, the mixer blocks 26 and 27 are inserted between the amplifiers 7, 8 and the oscillators I and II in Fig. 2. The scanning waves for the color-camera in Fig. 2 are not shown, as these are of conventional practice. However, the synchronizing pulses (for the camera) may be derived from the output of the transmitter, by apparatus similar to the receiving apparatus, so that better harmony of synchronization between camera and viewing image device may be obtained.

The system disclosed herein suggests itself that various substitutions of parts, adaptations and modifications are possible, for example, utilizing the system for conveying multiplex audio signals, instead of video signals, without departing from the spirit and scope thereof.

What I claim is:

1. In a system of time-divided modulation of a carrier wave where the amplitude-waveshape of each time division is required to approximate that of the simple curve of the sine-squared function, the system of producing said functions which comprises a first source of sinusoidal wave whose each cycle period is equal to the length of a time-division period; a second source of sinusoidal wave whose each half-cycle period is equal to the time length of a time-division period; means for phasing the waves of the first and second sources, so that when the first is at its tangent the second is at its sine angle; a first impedance at the output of said phased first source of sinusoidal wave; second and third impedances at the output of said phased second source of sinusoidal wave; first rectifier means; a bias voltage source; an output impedance; means for forming a series-connected closed circuit by the first and second impedances, the first rectifier means, and the output impedance; means for adjusting the amplitude relations of said bias and the voltage across the first impedance, so that the bias is equal to the peak-to-peak voltage across the first impedance, whereby normally zero current reaches through the rectifier and the output impedance only when the sinusoidal voltage across the first impedance is at its negative peak, and thereby producing voltage functions of aforementioned shape continuously across the output impedance; means for adjusting the peak voltages across the second and third impedances substantially identically to at least equal to said peak-to-peak voltage, whereby during the negative half-cycle voltage across the second impedance the current across said output impedance assumes substantially complete quiescence, while during the positive half-cycle voltage the produced voltage across said output impedance is equal substantially proportional to the added voltages across said first and second impedances; a second rectifier means and means therefor for connecting same in series with the third impedance, oppositely polarized with respect to the first rectifier-means upon said output impedance, whereby the voltage from across said second impedance is cancelled out from across said output impedance, and thereby producing periodic said functions across the output impedance.

2. The system as set forth in claim 1, which includes a fourth impedance at the output of said phased first source of sinusoidal wave; rectifier means; a resistive element and a capacitive element connected in parallel; means for forming a closed circuit by the last named element, the rectifier means, and the fourth impedance, whereby producing a steady state voltage across the capacitive element; and means for replacing said bias source by the last named voltage, and means therefor for adjusting its potential equal to the replaced bias source.

3. In a system of time-divided modulation of a carrier wave, where the amplitude-waveshape of each time division is required to approximate that of the simple curve of the sine-squared function, and wherein the carrier time divisions are first modulated by intelligence signals in steady state steps periodically in alternate periods in first and second branches, and further wherein those steady state modulated divisions are to be combined for final amplitude waveshaping, the system for effecting this process which comprises the following: Means for producing said periodically steady state modulated carrier wave in alternate periods in said first and second branches; first and second modulator electron devices, each having an input and output element; first and second suppression electron devices, each having an input and output element; means for producing periodic voltage functions, of the shape aforesaid, in alternate sequence in first and second branches, in phase with said steady state modulations of said carrier; means for connecting the output elements of the first and second suppression devices in parallel with the output elements of the first and second modulator devices respectively; means for applying said modulated carrier from said first branch upon the input elements of the first modulator device and the first suppression device in opposite phases; means for applying said modulated carrier from said second branch upon the input elements of the second modulator device and the second suppression device in opposite phases; a negative bias source for the first and second modulator devices, and adjustment means therefor, so that the normal gains of these devices are at their minimum levels; means for adjusting the gain factors of said first and second suppression devices, whereby normally at the output elements of the first and second modulator devices said carrier is suppressed; means for applying said periodic voltage functions from said first and second branches upon the input elements of the first and second modulator devices, respectively, for raising their amplitude gains from said minimum levels, whereby only said periodic steady state modulated time divisions of said carrier appear at the output elements of the modulator devices; and means for finally combining the outputs of the first and second modulators, thereby effecting continuous time divisions of the carrier, having the amplitude waveshape aforesaid.

4. The system as set forth in claim 3, which includes means for controlling the gain variations of said first and second suppression electron devices, due to normal imperfections of electron devices, which comprises the following parts: First and second phase discriminator means; means for applying said carrier wave arriving at the output elements of said first and second modulator devices upon said first and second phase discriminator means, respectively, in a mode as to normally produce substantially zero voltage at the outputs of these discriminators; first and second normally inoperative gates, each having input and output elements; means for applying said carrier arriving at the input elements of said first and second modulators, to the input elements of the first and second gates, respectively, and means associated therewith, for applying the admitted carrier waves at the output elements of the first and second gates to mix with the carrier waves applied upon said first and second phase discriminators, respectively, in substantially in-phase relations; an alternating switching voltage, and means therefor for switching the first and second gates to operative states periodically during said suppression periods, whereby effecting mixture of the admitted carrier at the output elements of the first and second gates with any residual carrier in the first and second phase discriminator means, respectively, and thereby producing output voltages at the phase discriminators in either positive or negative polarity, depending on whether the magnitudes of wave suppression are in higher or lower than the required value; and means for feeding these output voltages upon the input elements of said first and second suppression devices, respectively, for controlling their gains until said suppression is complete.

References Cited in the file of this patent

UNITED STATES PATENTS 2,558,489 Kalfaian ---------------- June 26, 1951